Dec. 18, 1923. 1,478,330
C. FOWLER
INSECT CATCHER
Filed Aug. 9, 1922
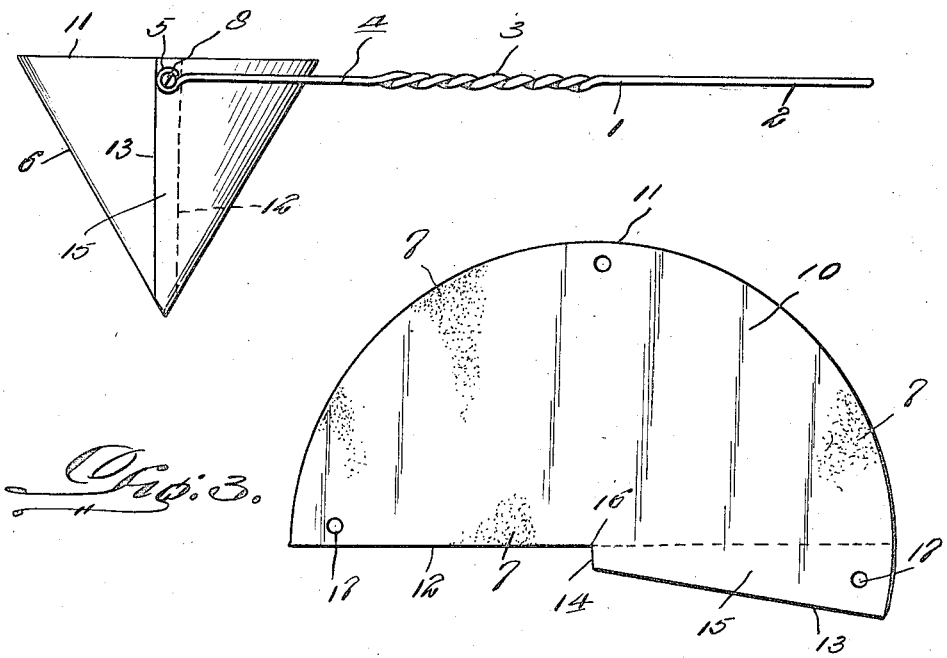
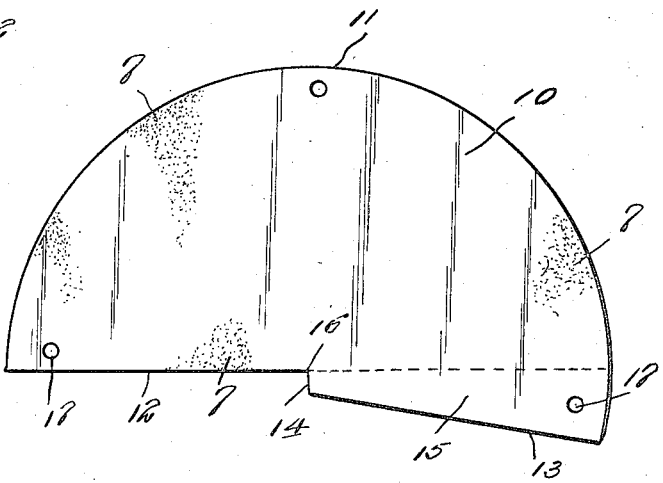
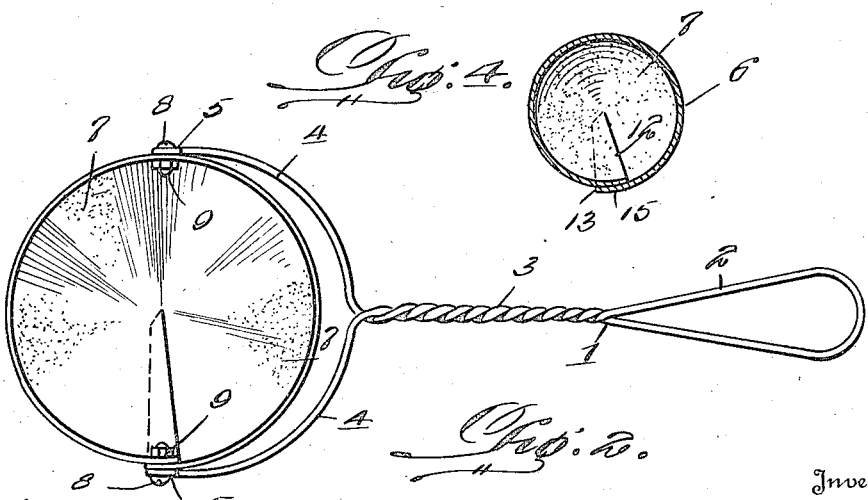
Inventor
Charles Fowler,
Witnesses:
F. L. Fox,
M. A. Watson.
By
Attorney Patented Dec. 18, 1923.

1,478,330

UNITED STATES PATENT OFFICE.

CHARLES FOWLER, OF TOMKINS COVE, NEW YORK.

INSECT CATCHER.

Application filed August 9, 1922. Serial No. 580,702.

*To all whom it may concern:*

Be it known that I, CHARLES FOWLER, a citizen of the United States, residing at Tomkins Cove, in the county of Rockland and State of New York, have invented new and useful Improvements in Insect Catchers, of which the following is a specification.

This invention relates to insect catchers, and particularly to insect catchers of that type comprising a manipulating handle and a receptacle carried thereby and adapted, by manipulating the handle, to be disposed over the insect to trap the same therein, said receptacle being provided with a sticky or adhesive surface with which the insect must come in contact, thereby causing the insect to be held within the receptacle against any possibility of escape.

One object of my invention is to provide a receptacle which may be sold in flat condition and formed into shape and applied to the handle by the purchaser or user, one receptacle blank being initially sold for instance to the purchaser with a handle to make up the complete device, the purchaser being enabled thereafter to procure a suitable number of the receptacle blanks in package form for use as occasion requires, thus allowing the user to secure additional receptacles from time to time for use with the original handle and to burn or otherwise destroy the receptacles as they are filled with flies, whereby a sanitary type of fly catcher is produced which may be bought and kept in serviceable condition at small expense.

A further object of the invention is to provide a conical form of catcher receptacle which may be easily and conveniently formed at the time of use from a blank, the construction of the blanks being such as to adapt them to be readily and cheaply manufactured and packed in flat form to enable them to be shipped and handled at less expense and with a saving of time in manufacture and space in shipment and storage.

With these and other objects in view, the invention consists of the features of construction, combination and arrangement of parts, hereinafter fully described and claimed, reference being had to the accompanying drawing, in which:—

Figure 1 is a side elevation of the device with parts assembled for use.

Figure 2 is a front elevation of the same.

Figure 3 is a plan view of the blank from which the catcher receptacle is made.

Figure 4 is a cross-section through the formed receptacle.

In the practical embodiment of my invention as disclosed, I provide a handle 1 composed of any suitable material or combination of materials. In the present instance it is shown composed of a strand of wire bent to form the grip portion 2 and twisted to form the shank portion 3, the ends of the wire being extended beyond the shank portion in a semi-circular loop providing more or less resilient yoke arms 4 having terminal eyes 5.

The handle as thus constructed is provided for supporting and manipulating the catcher receptacle 6. This catcher receptacle comprises a conical sack preferably formed of paper of suitable kind and thickness, the interior surface of which receptacle or sack is provided with a coating 7 of sticky material. The receptacle is so arranged as to be partially received within and embraced by the yoke formed by the arms 4, and said receptacle is pivoted at or adjacent to said yoke arms, at diametrically opposite sides thereof, by bolts 8 passing through the eyes 5 and the sides of the receptacle and provided with retaining nuts 9. The receptacle is thus so mounted that its angular position with relation to the plane of the handle 1 may be varied, and said receptacle disposed at different angles to said handle, for convenience in holding the same and manipulating the receptacle so that the open end or mouth portion thereof may be disposed over a fly or other insect arranged upon a table, wall or other surface, and to adapt the receptacle to adjust itself to irregularities of the surface. In such adjustments the resilient or spring yoke arms 4 bear with sufficient pressure upon the sides of the receptacle at the pivot points to maintain the receptacle in adjusted position and to prevent too much freedom of pivotal motion of the receptacle on the pivotal connections.

The receptacle 6 is formed from the blank 10 shown in Figure 3. This blank consists of a flat approximately semi-circular disk of paper or other sheet material having the more or less curved edge portion 11 and having the straight diametrical edge portion 12 on one side of its center and the oblique edge portion 13 on the opposite side of its diametrical center, said edge portions 12 and 13 being joined at their inner edges by the angularly related edge portion 14. The oblique edge 13 is formed at the outer edge with a substantially triangular wing or flap 15 forming an extension beyond the line of the edge 12, which flap provides a lap portion of proper shape to provide for an overlapping engagement between the marginal edges 12 and 13 in the shaping of the blank 10 into conical form to provide the receptacle 6. The described form of the blank adapts it to be shaped in conical form in which the point 16 at the intersection of the surfaces 12, 13 and 14 forms the apex of the cone, the edge portion 11, the marginal edge of the enlarged mouth of the cone and the wing 15 a part to overlie or overlap the opposed portion or meeting edge 12 of the completed cone, as shown clearly in Figure 4. Suitable openings 17 may be provided at proper points upon the blank for the passage of the pivot bolts 8 in mounting the cone upon the yoke arms of the handle. It will be observed that when the receptacle is formed and the parts are assembled, as described, the openings 17 in the meeting edges 12 and 13 will register and the bolt 8 which passes therethrough will therefore serve a double function, first, that of pivotally connecting the adjacent side of the receptacle to the associated arm 4 of the handle, and secondly, that of holding the meeting edges of the receptacle connected and the cone in proper formation without the use of separate and independent fastening devices for these purposes. By this means the necessity of providing auxiliary fastening devices for the purpose is avoided and economy of manufacture and simplicity of construction secured.

In the use of the device, when it is desired to entrap an insect, the device is manipulated to dispose the trap receptacle over a fly located on a wall, table or other receptacle; the open end of the receptacle 6 being made to encompass the insect. The insect immediately attempts to escape by flying and as there is but one direction for it to travel, it must come into contact with the sticky inner lining of the receptacle, and will therefore be held securely against escape. After a sufficient number of insects have thus been caught, the receptacle may be removed and burned or buried and a new receptacle applied to the holder, thus providing a sanitary device of this character.

One particular purpose of the invention, to which the construction especially lends itself, is the marketing of the device in compact form and in such a way as to allow the purchaser to use a single handle 1 permanently and to purchase receptacle forming blanks as needed. Thus the purchaser may first buy a handle, with which may be given or sold a single blank 10, with suitable directions for forming said blank into receptacle shape and applying the same to the handle. The articles thus arranged for sale may be disposed in compact form in a package, or, for convenience of the purchasing public, as in ten cent store transactions, the handle may be sold as one article and a flat package of a half dozen or a dozen blanks as a separate article, the purchaser employing the blanks as needed, so that the blanks not in use may be kept stored in the package for convenience and for successive use as required. The packaging of the blanks in flat form, any suitable number to a package, also enables the purchaser to buy a number of blanks at a very low price, and saves the manufacturer the expense of assemblage, as well as affording greater convenience to the manufacturer and the store keeper in shipping and storing or displaying the goods for sale. The construction of the blank, and the receptacle formed therefrom, is further such as to enable anyone to easily and conveniently form the receptacle and apply it for use.

Having thus fully described my invention, I claim:

1. An insect catcher comprising a handle having spaced resilient yoke arms provided with eyes, a receptacle of conical form shaped from a primarily flat blank and pivotally attached to the respective yoke arms, said receptacle having lapping meeting edges formed with registering openings, and pivot pins engaging the eyes of the yoke arms, one of said pins passing through one side of the receptacle and the other of said pins passing through said registering openings, whereby the receptacle is pivotally connected by the pins with said yoke arms and is held in closed condition by the pivot pin connection between the same and one of said yoke arms.

2. An insect catcher comprising a handle having yoke arms, and a catcher receptacle of conical form shaped from a blank and having meeting edges adapted to overlap at one side of said receptacle and provided with registered openings, and pivotal connections between the yoke arms and diametrical opposite sides of the receptacle, one of said pivotal connections passing through the said registering openings in said meeting edges and holding the same connected and the receptacle in formed condition.

3. In an insect catcher, a blank for use in making a catcher receptacle of substantially conical form, said blank comprising a substantially semi-circular disk of sheet material having adhesive material on one side thereof, said blank having its straight diametrical edge provided on one side of its center with a wing or extension formed with an outer oblique edge and providing a substantially triangular wing adapted in the formation of the receptacle to overlap the other portion of the straight edge.

4. The combination with a handle, having yoke arms provided with terminal eyes, of a substantially conical receptacle formed from a normally flat semi-circular blank having adhesive material upon one side thereof, said blank being provided with a substantially triangular flap on one side of the center of its straight edge adapted to be folded over upon and overlap the opposed portion of said straight edge, the body of the blank being formed with a central opening adjacent to the center of its circular edge and with openings in its straight edge and flap portions adapted to register when the blank is folded into conical form, and fastening connections pivotally coupling the receptacle to the yoke arms, one of said fastening connections passing through the first-named opening in the blank and the eye of one of the yoke arms and the other fastening connection passing through the registering openings in the other portions of the blank and the eye of the other yoke arm, said latter-named fastening connection holding the lapping portions of the blank in lapping engagement.

In testimony whereof I affix my signature.

CHARLES FOWLER.